US012566308B2

(12) United States Patent
Liu et al.

(10) Patent No.: US 12,566,308 B2
(45) Date of Patent: Mar. 3, 2026

(54) LENS MODULE AND COMPONENT FOR LENS MODULE

(71) Applicant: NEWMAX TECHNOLOGY CO., LTD., Taichung City (TW)

(72) Inventors: Szu-Ying Liu, Taichung City (TW); Wei-Lan Shih, Taichung City (TW); Jen-Chieh Su, Taichung City (TW)

(73) Assignee: NEWMAX TECHNOLOGY CO., LTD., Taichung City (TW)

( * ) Notice: Subject to any disclaimer, the term of this patent is extended or adjusted under 35 U.S.C. 154(b) by 819 days.

(21) Appl. No.: 17/865,665

(22) Filed: Jul. 15, 2022

(65) Prior Publication Data

US 2023/0367097 A1     Nov. 16, 2023

(30) Foreign Application Priority Data

May 10, 2022     (TW) ................................. 111117416

(51) Int. Cl.
*G02B 7/02*        (2021.01)
*G02B 5/00*        (2006.01)
*G02B 5/26*        (2006.01)
(52) U.S. Cl.
CPC ............. *G02B 7/026* (2013.01); *G02B 5/003* (2013.01); *G02B 5/26* (2013.01); *G02B 7/021* (2013.01)

(58) Field of Classification Search
CPC .......... G02B 7/026; G02B 7/021; G02B 3/00; G02B 5/26; G02B 5/003
See application file for complete search history.

(56) References Cited

U.S. PATENT DOCUMENTS

| | | | | |
|---|---|---|---|---|
| 2010/0027137 A1* | 2/2010 | Noh | ........................ | G02B 7/022 |
| | | | | 359/811 |
| 2017/0131513 A1* | 5/2017 | Lin | ......................... | G02B 7/021 |
| 2018/0003916 A1* | 1/2018 | Lin | ......................... | G02B 7/022 |
| 2018/0292626 A1* | 10/2018 | Chou | ................... | G02B 13/003 |
| 2022/0043325 A1* | 2/2022 | Huang | ............... | G02B 27/0018 |

FOREIGN PATENT DOCUMENTS

CN            210323530 U   *   4/2020

* cited by examiner

*Primary Examiner* — Jonathan Y Jung
(74) *Attorney, Agent, or Firm* — Juan Carlos A. Marquez; Marquez IP Law Office, PLLC

(57)            ABSTRACT

A component for a lens module is selected from a group consisting of a lens barrel, an optical lens, a pressure ring, and a spacer ring. The component includes: a component surface, a flat region located on the component surface, and a microstructure region located on the component surface and adjacent to the flat region. Relative to the flat region, the microstructure region includes a plurality of convex portions and a plurality of concave portions. The convex portions are in a shape of a cone. Any area of 0.1 mm*0.1 mm in the microstructure region has n convex portions, where n≤50.

18 Claims, 10 Drawing Sheets

103'

1031'     1032'

LENS MODULE AND COMPONENT FOR LENS MODULE

CROSS-REFERENCE TO RELATED APPLICATION

This application claims the benefit of Taiwan Patent Application No. 111117416, filed on May 10, 2022, which is hereby incorporated by reference for all purposes as if fully set forth herein.

BACKGROUND

Technical Field

The present disclosure relates to a lens module, and in particular, to a component for a lens module, wherein a microstructure region generating multiple reflections of light is formed on a component surface of the component.

Related Art

Stray light is a general term for unwanted light in the lens module, and are generated from residual reflection (such as light leakage and light transmission of the lens surface) on the surface of an optical component and residual reflection on the surface of a non-optical component (such as an inner wall of the lens barrel, and the like). The stray light may cause the performance of the lens module to degrade, reduce the modulation transfer function of the lens module, and damage the imaging quality of the lens module. The specific performance is the reduction in imaging clarity, and the reduction in color saturation.

Referring to FIG. 1, a conventional lens module 9 is mainly composed of components such as a lens barrel 91, optical lenses 92, a spacer ring 94, or a pressure ring 93. The anti-reflection effect of the lens barrel 91, the optical lenses 92, or the spacer ring 94 is to perform a coating process on a component surface requiring anti-reflection to form surface blackening, so as to effectively reduce the light reflectivity. However, the coating technology can significantly reduce the light reflectivity of the material itself, the coating process cannot effectively suppress the stray light because the coating process itself easily causes problems of poor appearance such as scratches, adhesion, film cracks, and the like, resulting in the problem of reduced yield.

Therefore, it is necessary to provide a component for a lens module, so as to resolve the foregoing problems.

SUMMARY

An objective of the present disclosure is to provide a component for a lens module, wherein a microstructure region generating multiple reflections of light is formed on a component surface of the component.

To achieve the above objective, the present disclosure provides a component for a lens module, selected from a group consisting of a lens barrel, an optical lens, a pressure ring, and a spacer ring, the component comprising: a component surface; a flat region located on the component surface; and a microstructure region located on the component surface and adjacent to the flat region, wherein: relative to the flat region, the microstructure region comprises a plurality of convex portions and a plurality of concave portions; the convex portions are in a shape of a cone; and any area of 0.1 mm*0.1 mm in the microstructure region has n convex portions, wherein n≤50.

The present disclosure further provides a lens module, comprising: a lens barrel; an optical lens assembly disposed in the lens barrel and comprising a plurality of optical lenses; a pressure ring disposed in the lens barrel and abutting against the optical lens assembly; and a spacer ring disposed in the lens barrel and located in the optical lens assembly; wherein a component for the lens module is at least one component selected from a group consisting of the lens barrel, the optical lenses, the pressure ring, and the component comprising: a component surface; a flat region located on the component surface; and a microstructure region located on the component surface and adjacent to the flat region, wherein: relative to the flat region, the microstructure region comprises a plurality of convex portions and a plurality of concave portions; the convex portions are in a shape of a cone; and any area of 0.1 mm*0.1 mm in the microstructure region has n convex portions, wherein n≤50.

The component for the lens module of the present disclosure is processed by a molding process (e.g., an injection molding process), and the microstructure region generating multiple reflections of light is formed on the component surface. In this way, the scattering distribution characteristics of the component surface are changed to achieve the effect of suppressing stray light.

DETAILED DESCRIPTION

To make the foregoing objective, features, and characteristics of the present disclosure clearer and more comprehensive, detailed descriptions are provided below with reference to the accompanying drawings.

Figure 1:
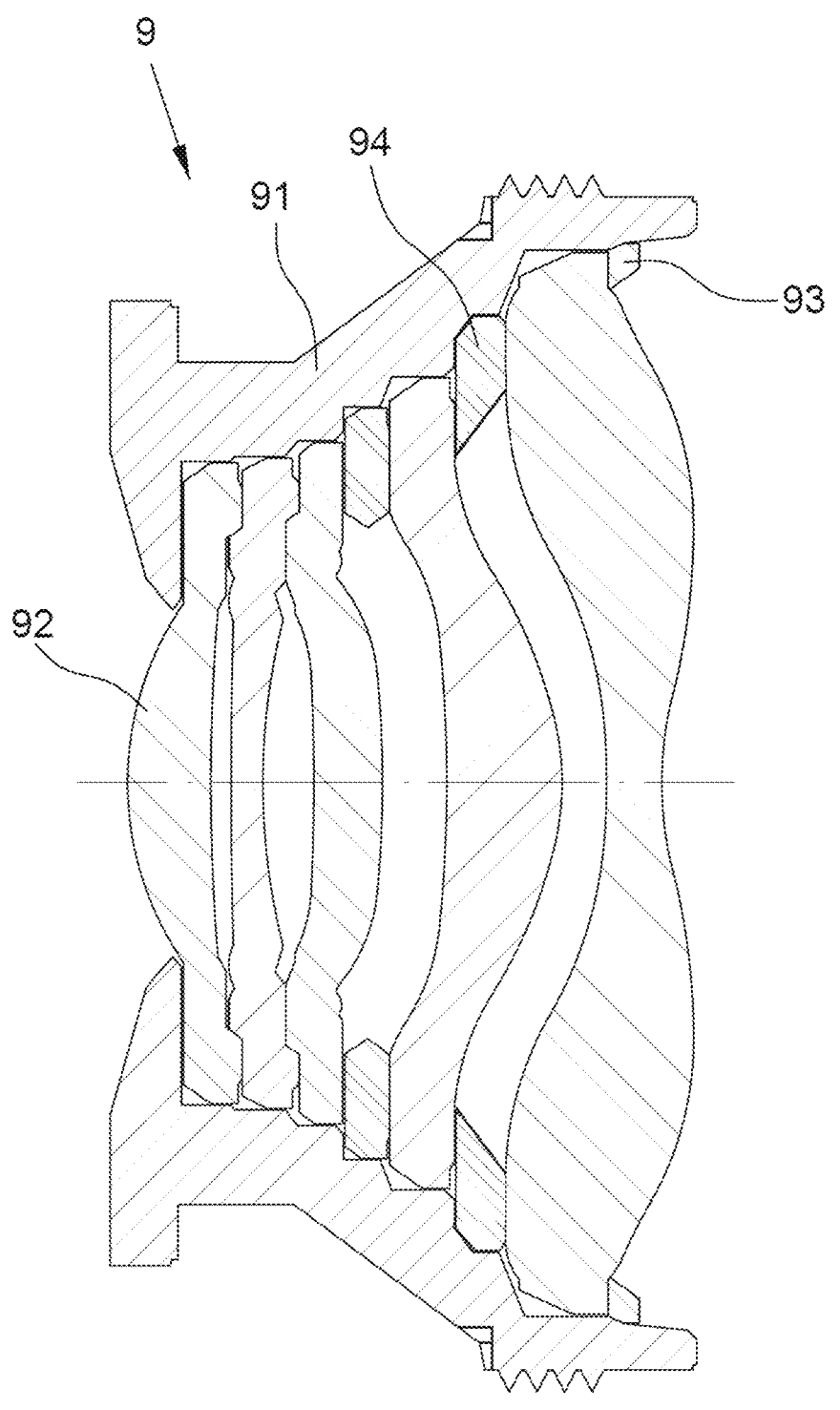
FIG. 1 is a schematic cross-sectional view of a conventional lens module.
Figure 2A:
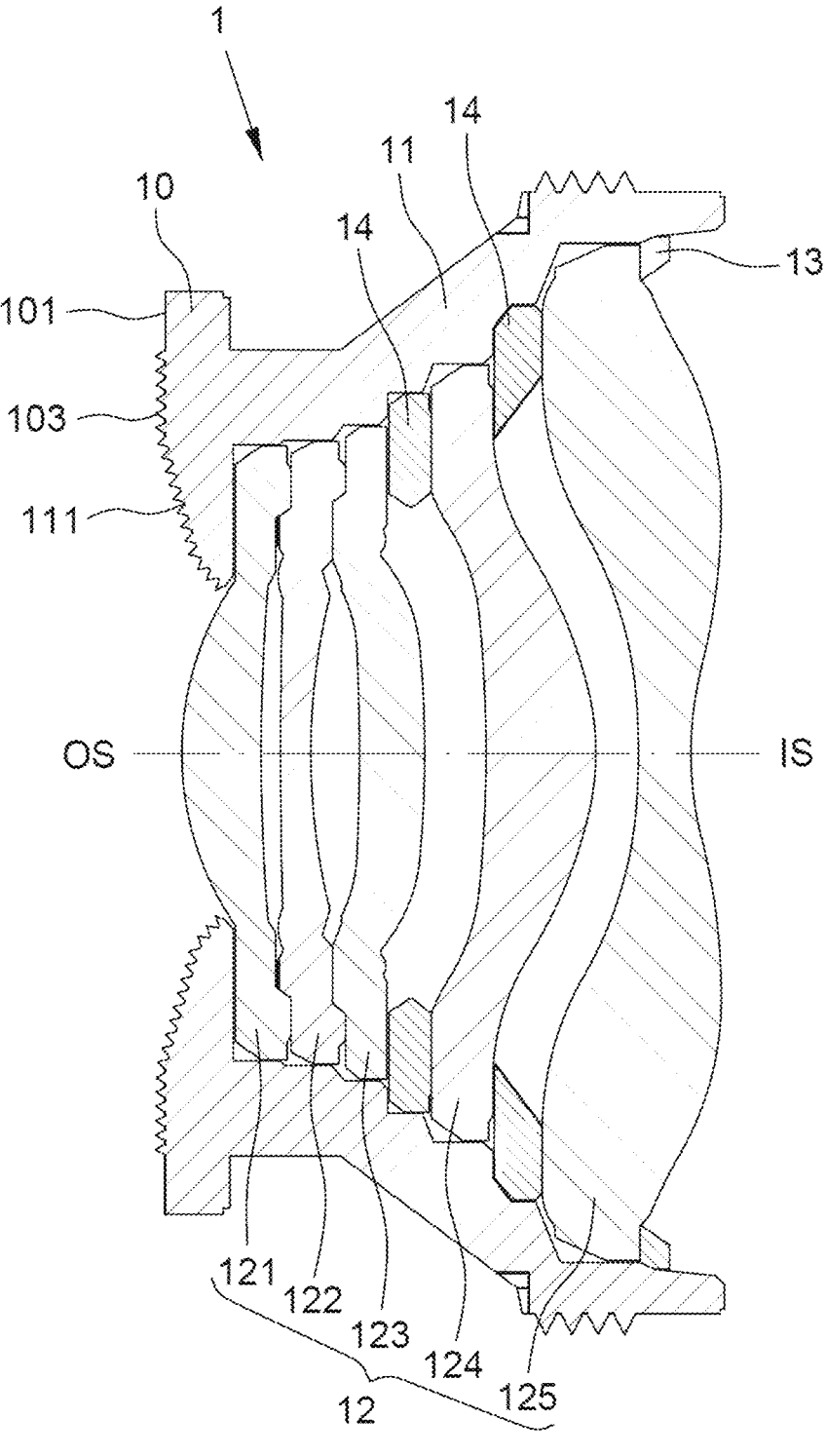
FIG. 2a to FIG. 2c are schematic cross-sectional views (I)-(III) of a lens module according to a first embodiment of the present disclosure.
Figure 2B:
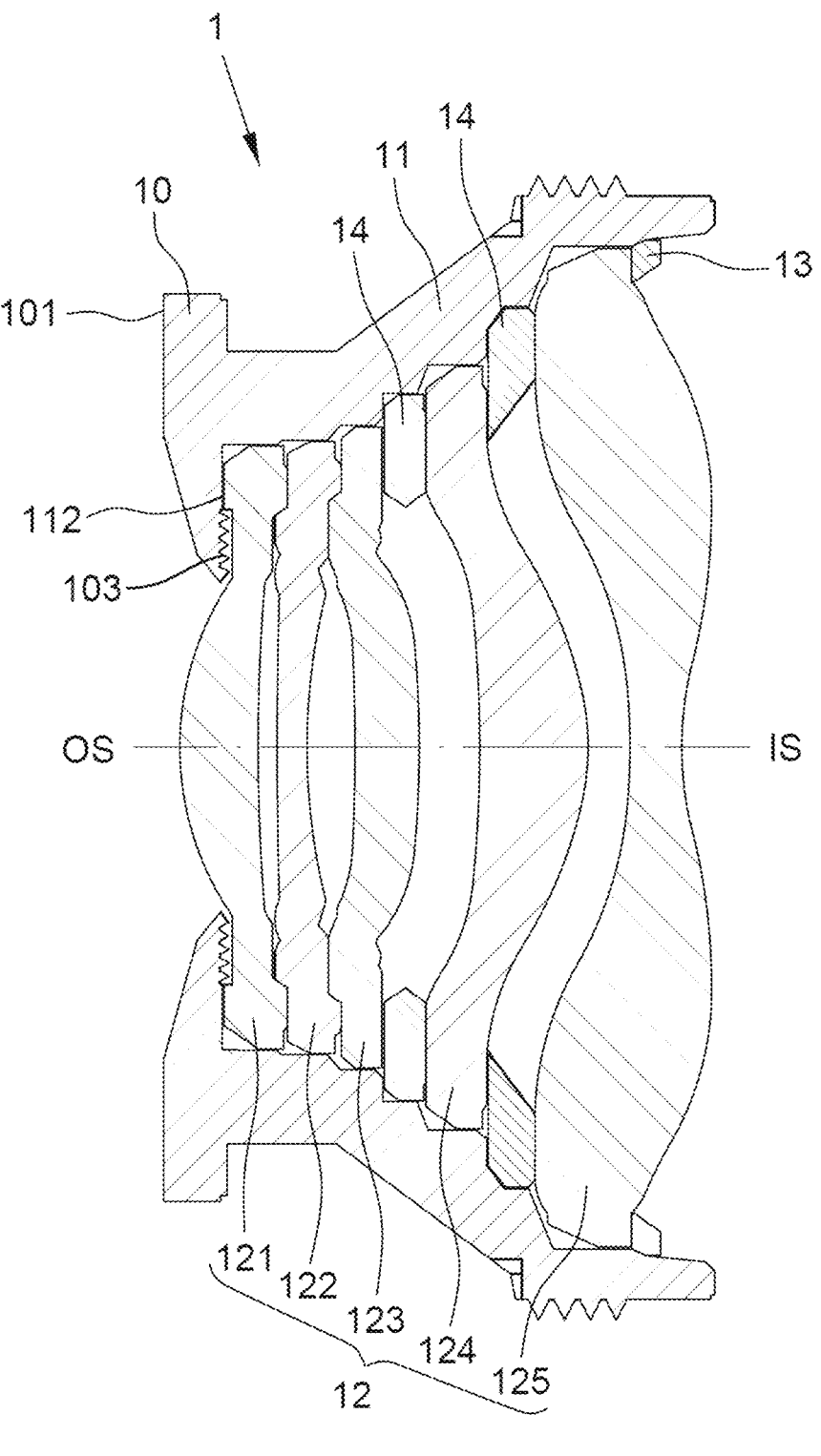
Figure 2C:
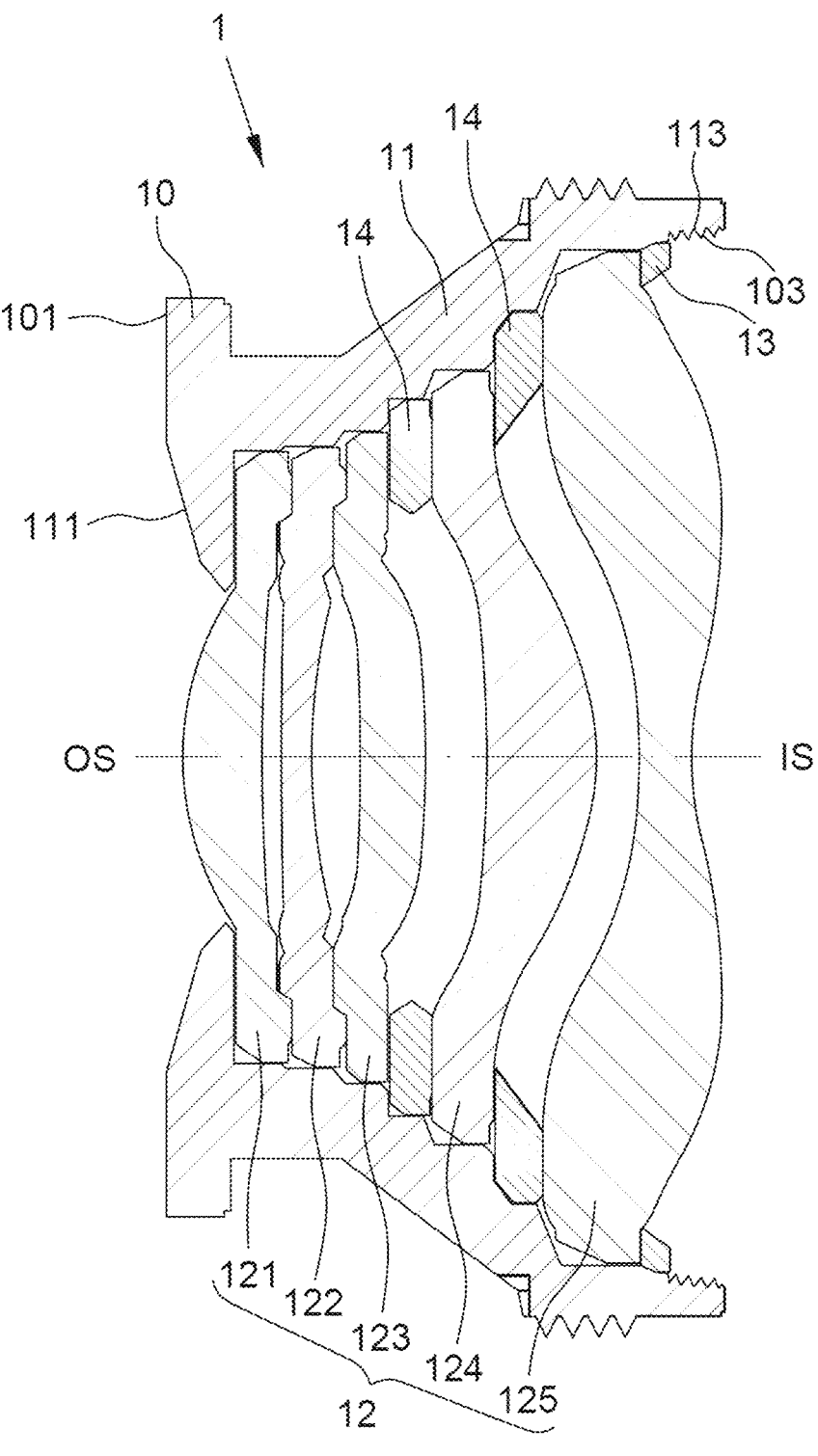

FIG. 2a to FIG. 2c are schematic cross-sectional views (I)-(III) of a lens module according to a first embodiment of the present disclosure. Referring to FIG. 2a, a lens module 1 includes a lens barrel 11, an optical lens assembly 12, a pressure ring 13, and at least one spacer ring 14. The lens barrel 11 may be an integrated lens barrel and may be made of plastic material. The optical lens assembly 12 is disposed in an accommodating space of the lens barrel 11 and includes a plurality of optical lenses. The optical lenses may be made of plastic material or glass material. The pressure ring 1 is also disposed in the lens barrel 11 and abuts against the optical lens assembly 12 to prevent the optical lenses from falling out of the lens barrel 11. The pressure ring 13 may be made of metal material or plastic material. The spacer ring 14 is also disposed in the lens barrel 11 and located in the optical lens assembly 12 to determine a distance between two adjacent optical lenses, so as to control an air space between the two adjacent optical lenses. A material of the spacer ring 14 may be metal material or plastic material. For example, the lens module 1 includes, in order from an object-side OS to an image-side IS, a first optical lens 121, a second optical lens 122, a third optical lens 123, the spacer ring 14, a fourth optical lens 124, the spacer ring 14, a fifth optical lens 125, and the pressure ring 13. A component 10 for the lens module 1 of the present disclosure is at least one component 10 selected from a group consisting of the lens barrel 11, the first to fifth optical lenses 121-125, the pressure ring 13, and the spacer ring 14.

Figure 3:
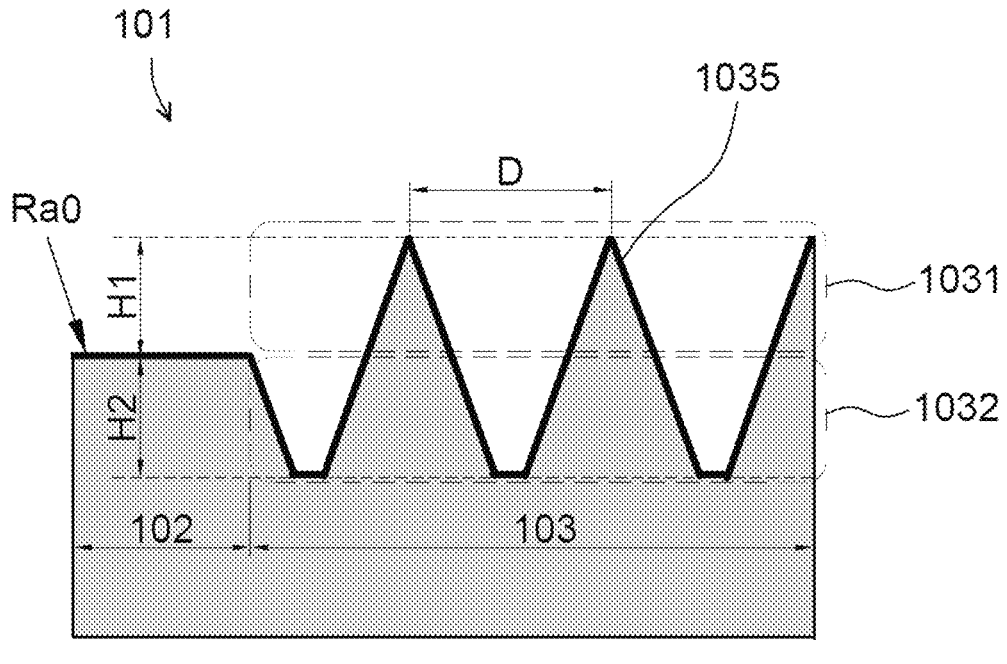
FIG. 3 is a schematic cross-sectional view of a flat region and a microstructure region on a component surface according to an embodiment of the present disclosure.
Figure 4:
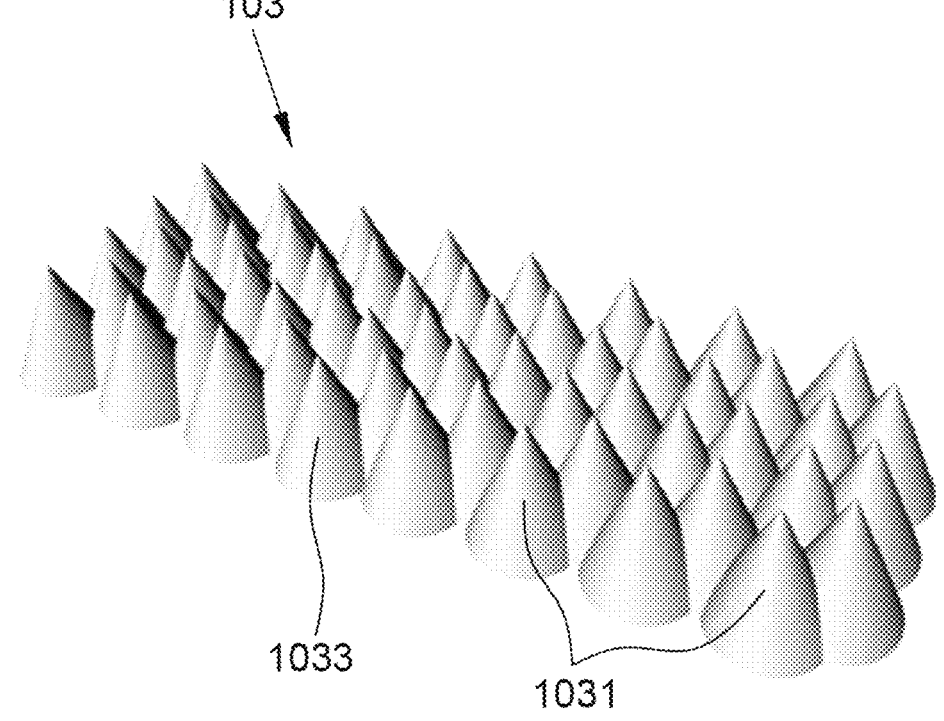
FIG. 4 is a schematic three-dimensional view of a microstructure region according to an embodiment of the present disclosure, showing convex portions being in a shape of a cone.

In the first embodiment, the component 10 for the lens module 1 of the present disclosure is the lens barrel 11. FIG. 3 is a schematic cross-sectional view of a flat region and a microstructure region on a component surface according to an embodiment of the present disclosure. Referring to FIG. 3, the component 10 (i.e., the lens barrel 11) includes a component surface 101 (i.e., the lens barrel surface), a flat region 102, and a microstructure region 103. The flat region 102 is located on the component surface 101, and is defined with a surface roughness Ra0, where Ra0<1 μm. The microstructure region 103 is located on the component surface 101 and adjacent to the flat region 102. Relative to the flat region 102, the microstructure region 103 includes a plurality of convex portions 1031 and a plurality of concave portions 1032. The convex portions 1031 are in a shape of a cone 1033 (as shown in FIG. 4). The component 10 (i.e., the lens barrel 11) for the lens module 1 of the present disclosure is processed by a mold and then by an injection molding process, and the microstructure region 103 generating multiple reflections of light is finally formed on the component surface 101. In this way, the scattering distribution characteristics of the component surface 101 are changed to achieve the effect of suppressing stray light.

Figure 5:
FIG. 5 is a schematic three-dimensional view of a microstructure region on an inner surface of a mold according to an embodiment of the present disclosure, showing convex portions and concave portions.
Figure 6:
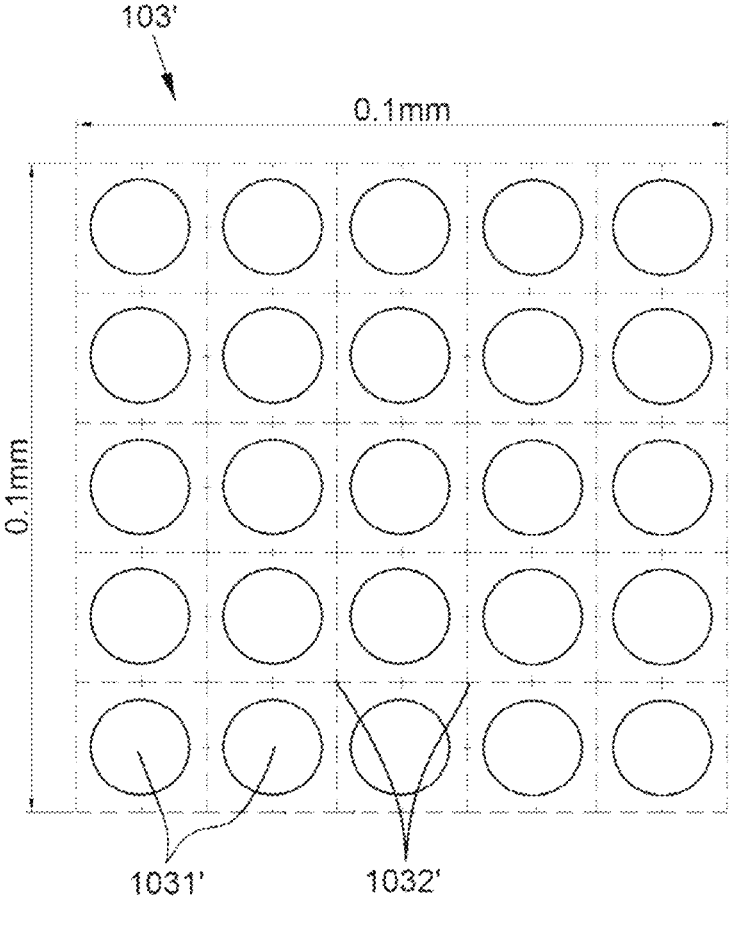
FIG. 6 is a schematic plan view of a microstructure region on an inner surface of a mold according to an embodiment of the present disclosure, showing any area of 0.1 mm*0.1 mm in the microstructure region having n concave portions.

FIG. 5 is a schematic three-dimensional view of a microstructure region on an inner surface of a mold according to an embodiment of the present disclosure. Referring to FIG. 5 and FIG. 3, the inner surface of the mold refers to an inner surface of an injection mold for manufacturing the lens barrel 11. For example, a plurality of concave portions 1031' (e.g., conical holes) are formed in the inner surface of the mold by using a laser drilling process, and a plurality of convex portions 1032' are formed at locations of molten metal deposition among the concave portions 1031'. The concave portions 1031' and the convex portions 1032' of the microstructure region 103' on the inner surface of the mold correspond to the convex portions 1031 and the concave portions 1032 of the microstructure region 103 on the component surface 101. In this way, during the injection molding process, the concave portions 1031' and the convex portions 1032' of the microstructure region 103' on the inner surface of the mold can be transferred into the convex portions 1031 and the concave portions 1032 of the microstructure region 103 on the component surface 101 in a transfer printing manner. FIG. 6 is a schematic plan view of a microstructure region on an inner surface of a mold according to an embodiment of the present disclosure. Any area of 0.1 mm*0.1 mm in the microstructure region 103' on the inner surface of the mold has n concave portions 1031', where $1 \leq n \leq 50$. In other words, referring to FIG. 4 again, any area of 0.1 mm*0.1 mm in the microstructure region 103 on the component surface 101 has n convex portions 1031, where $1 \leq n \leq 50$, so that the microstructure region 103 can reduce the light reflection effect and suppress stray light. Preferably, the area of 0.1 mm*0.1 mm in the microstructure region 103 on the component surface 101 has n convex portions 1031, where $15 \leq n \leq 30$, so that the microstructure region 103 can reduce the light reflection effect and is easily shaped.

Referring to FIG. 3 again, each of the convex portions 1031 has a top portion 1035. A distance D exists between every two adjacent top portions 1035, where $14 \ \mu m \leq D \leq 40$ μm, so that the microstructure region 103 may be easily shaped. Preferably, the following relation is also satisfied: $20 \ \mu m \leq D \leq 30$ μm. Relative to the flat region 102, the convex portions 1031 have a height H1, where $H1 \geq 4$ μm, so that the microstructure region 103 can reduce the light reflection effect. Considering the mold processing capability and the injection molding effect, the height H1 of the convex portions 1031 is less than or equal to 50 μm. Preferably, $0.1 \leq H1/D \leq 3.5$, so that the microstructure region 103 can reduce the light reflection effect and be easily shaped. Relative to the flat region 102, the concave portions 1032 have a depth H2, where $H2 \geq 3$ μm, so that the microstructure region 103 can reduce the light reflection effect. Preferably, $H1+H2 \geq 10$ μm, so that the microstructure region 103 can further reduce the light reflection effect.

Referring to FIG. 4 again, the convex portions 1031 may be in a shape of a circular cone or a polygonal cone (not shown), and the convex portions 1031 in the shape of a cone are arranged in a staggered manner, so that the convex portions 1031 can be closely arranged to increase the density of the convex portions 1031.

Figure 7:
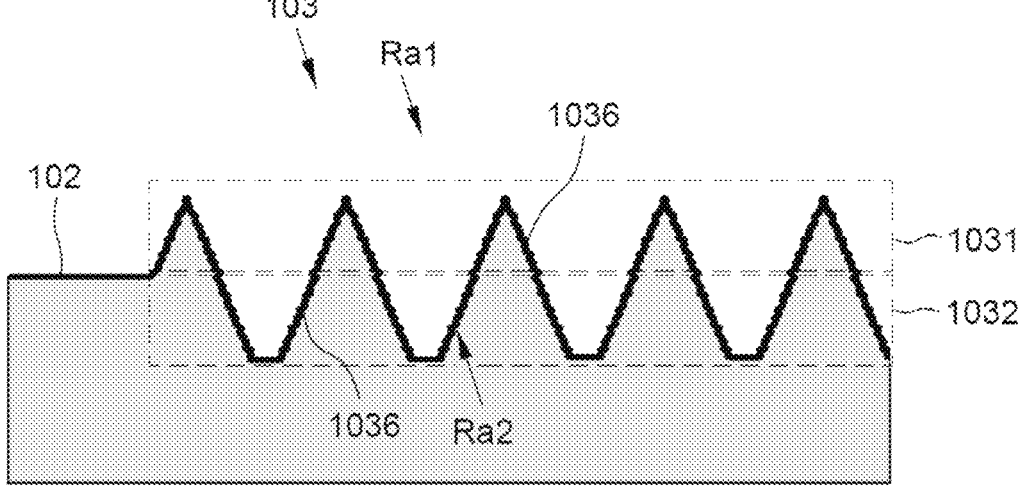
FIG. 7 is a schematic cross-sectional view of a flat region and a microstructure region on a component surface according to another embodiment of the present disclosure.

FIG. 7 is a schematic cross-sectional view of a flat region and a microstructure region on a component surface according to another embodiment of the present disclosure. Referring to FIG. 7, surfaces of the convex portions 1031 and surfaces of the concave portions 1032 are provided with a nano-sized granular rough surface 1036. The microstructure region 103 including the convex portions 1031 and the concave portions 1032 has a first surface roughness Ra1 (e.g., $2 \ \mu m \leq Ra1 \leq 50$ μm), and the convex portions 1031 and the concave portions 1032 including the granular rough surface 1036 have a second surface roughness Ra2, where Ra2<Ra1.

When the component 10 for the lens module 1 is the lens barrel 11, the microstructure region 103 may be located on at least one of an object-side surface 111 (as shown in FIG. 2a), an image-side surface 112 (as shown in FIG. 2b), or an inner ring surface 113 (as shown in FIG. 2c) of the component surface 101 (i.e., a surface of the lens barrel 11). If the microstructure region 103 is applied to a surface of a light-transmitting hole of the lens barrel 11 (i.e., the object-side surface 111), the microstructure region 103 has the effect of reducing the reflectivity. If the microstructure region 103 is applied to a surface on the inner side of the lens barrel 11 (i.e., the image-side surface 112 and the inner ring surface 113), the microstructure region 103 has the effect of reducing the reflectivity and can suppress the stray light.

Figure 8:
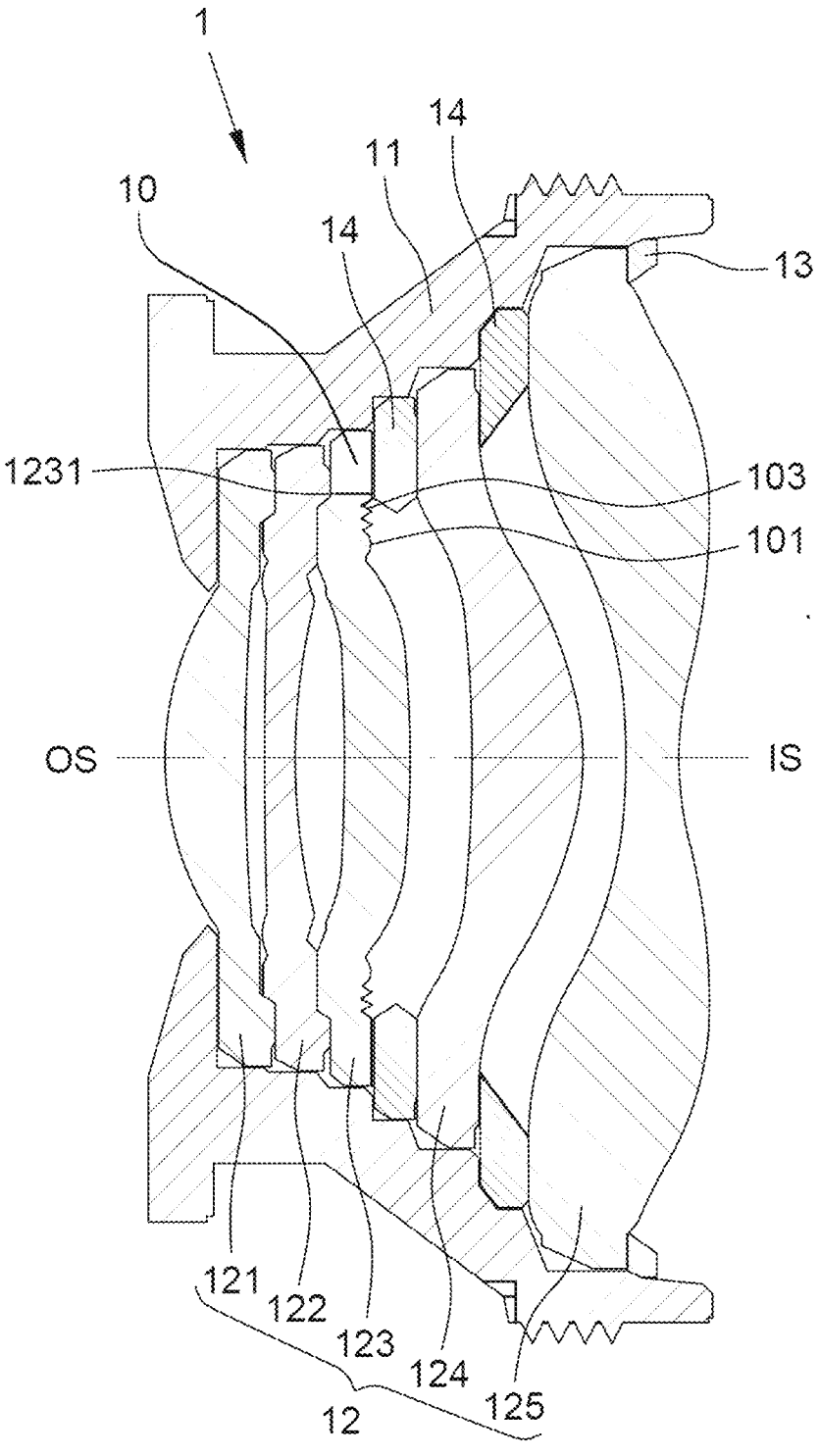
FIG. 8 is a schematic cross-sectional view of a lens module according to a second embodiment of the present disclosure.

FIG. 8 is a schematic cross-sectional view of a lens module according to a second embodiment of the present disclosure. The lens module of the second embodiment is substantially similar to the lens module of the first embodiment, and similar components are marked with similar reference numerals. A difference between the lens modules 1 of the second embodiment and the first embodiment is as follows. In a second embodiment, the component 10 for the lens module 1 of the present disclosure is an optical lens (e.g., the third optical lens 123), and the microstructure region 103 is located on a non-optical region 1231 of the component surface 101 (i.e., a surface of the optical lens 123), and is not in contact with other components 10 (e.g., the spacer ring 14) for the lens modules 1. The structure and functions of the microstructure region 103 of the second embodiment are the same as those of the microstructure region 103 of the first embodiment, and the details are not described. If the microstructure region 103 is applied to the optical lens, the microstructure region 103 may be arranged outside the optical region of the optical lens (i.e., the non-optical region 1231) without affecting the demolding position, so as to have the effect of reducing the reflectivity and suppress the stray light.

Figure 9:
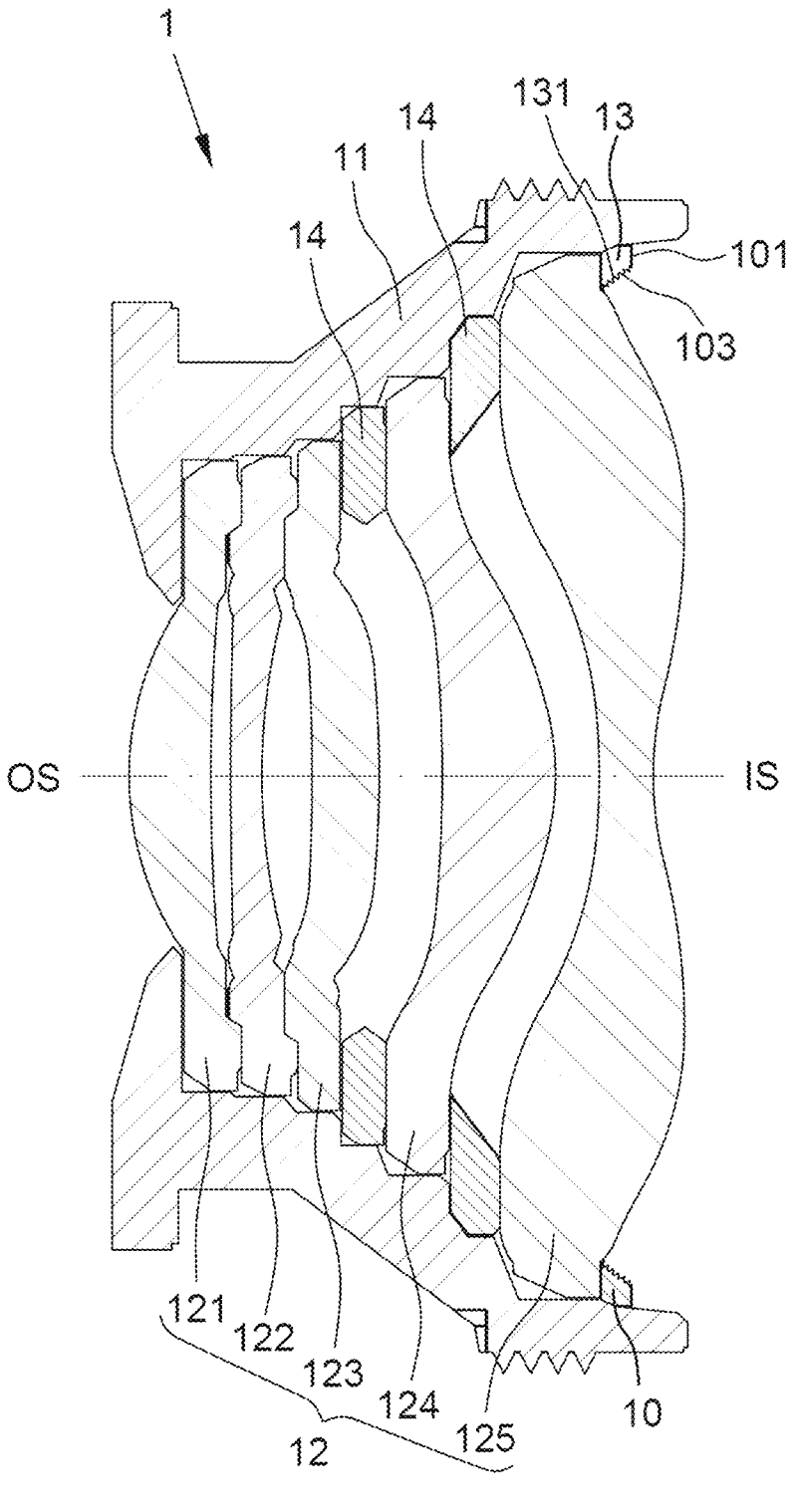
FIG. 9 is a schematic cross-sectional view of a lens module according to a third embodiment of the present disclosure.

FIG. 9 is a schematic cross-sectional view of a lens module according to a third embodiment of the present disclosure. The lens module of the third embodiment is substantially similar to the lens module of the first embodiment, and similar components are marked with similar reference numerals. A difference between the lens modules 1 of the third embodiment and the first embodiment is as follows. In the third embodiment, the component 10 for the lens module 1 of the present disclosure is the pressure ring 13, and the microstructure region 103 is located on an inner ring surface 131 of the component surface 101 (i.e., a surface of the pressure ring 13). The structure and functions of the microstructure region 103 of the third embodiment are the same as those of the microstructure region 103 of the first embodiment, and the details are not described. If the microstructure region 103 is applied to the pressure ring 13, the microstructure region 103 may be arranged on the inner ring surface 131 of the component surface 101 (i.e., the surface of the pressure ring 13), so as to have the effect of reducing reflectivity and suppress stray light.

Figure 10:
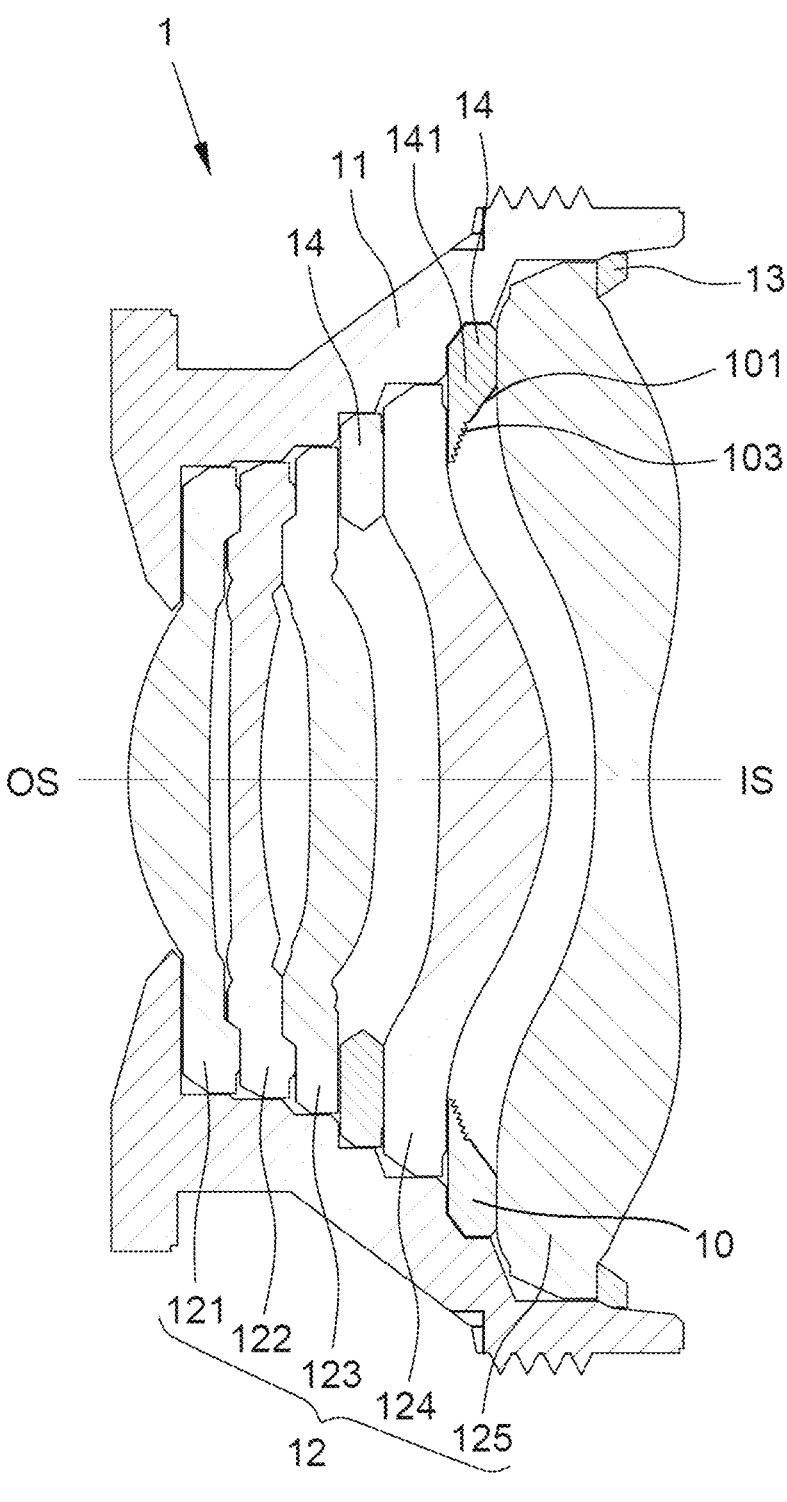
FIG. 10 is a schematic cross-sectional view of a lens module according to a fourth embodiment of the present disclosure.

FIG. 10 is a schematic cross-sectional view of a lens module according to a fourth embodiment of the present disclosure. The lens module of the fourth embodiment is substantially similar to the lens module of the first embodiment, and similar components are marked with similar reference numerals. A difference between the lens module 1 of the fourth embodiment and the first embodiment is as follows. In the fourth embodiment, the component 10 for the lens module 1 of the present disclosure is the spacer ring 14, and the microstructure region 103 is located on an inner ring surface 141 of the component surface 101 (i.e., a surface of the spacer ring 14). The structure and functions of the microstructure region 103 of the fourth embodiment are the same as those of the microstructure region 103 of the first embodiment, and the details are not described. If the microstructure region 103 is applied to the spacer ring 14, the microstructure region 103 may be arranged on the inner ring surface 141 of the component surface 101 (i.e., the surface of the spacer ring 14), so as to have the effect of reducing reflectivity and suppress stray light.

In conclusion, preferred implementations or embodiments of the technical means adopted by the present disclosure to resolve the problems of the present disclosure are merely recorded, and are not intended to limit the scope of implementation of the present disclosure. That is, any equivalent changes and modifications literally conforming to the scope of the claims of the present disclosure or made according to the scope of the claims of the present disclosure shall fall within the scope of the present disclosure.

What is claimed is:

1. A component for a lens module, selected from a group consisting of a lens barrel, an optical lens, a pressure ring, and a spacer ring, the component comprising:
   a component surface;
   a flat region located on the component surface; and
   a microstructure region located on the component surface and adjacent to the flat region, wherein:
   relative to the flat region, the microstructure region comprises a plurality of convex portions and a plurality of concave portions;
   the convex portions are in a shape of a cone; and
   any area of 0.1 mm*0.1 mm in the microstructure region has n convex portions, wherein $n \leq 50$;
   wherein the convex portions each have a top portion, a distance D exists between every two adjacent top portions, wherein 14 $\mu m \leq D \leq 40$ $\mu m$.

2. The component for a lens module according to claim 1, wherein the convex portions have a height H1 relative to the flat region, wherein $H1 \geq 4$ $\mu m$.

3. The component for a lens module according to claim 2, wherein the concave portions have a depth H2 relative to the flat region, wherein $H2 \geq 3$ $\mu m$.

4. The component for a lens module according to claim 3, wherein $H1 + H2 \geq 10$ $\mu m$.

5. The component for a lens module according to claim 2, wherein $0.1 \leq H1/D \leq 3.5$.

6. The component for a lens module according to claim 1, wherein a surface roughness Ra0 is defined for the flat region, wherein Ra0<1 $\mu m$.

7. The component for a lens module according to claim 1, wherein surfaces of the convex portions and surfaces of the concave portions are provided with a nano-sized granular rough surface.

8. The component for a lens module according to claim 7, wherein the microstructure region comprising the convex portions and the concave portions has a first surface roughness Ra1, and the convex portions and the concave portions comprising the granular rough surface have a second surface roughness Ra2, wherein Ra2<Ra1.

9. The component for a lens module according to claim 1, wherein the convex portions are in a shape of a circular cone or a polygonal cone.

10. The component for a lens module according to claim 1, wherein the convex portions in the shape of a cone are arranged in a staggered manner.

11. The component for a lens module according to claim 1, wherein the area of 0.1 mm*0.1 mm in the microstructure region on the component surface has n convex portions, wherein $15 \leq n \leq 30$.

12. A lens module, comprising:
   a lens barrel;
   an optical lens assembly disposed in the lens barrel and comprising a plurality of optical lenses;
   a pressure ring disposed in the lens barrel and abutting against the optical lens assembly; and
   a spacer ring disposed in the lens barrel and located in the optical lens assembly;

wherein a component for the lens module is at least one component selected from a group consisting of the lens barrel, the optical lenses, the pressure ring, and the component comprising:

a component surface;

a flat region located on the component surface; and a microstructure region located on the component surface and adjacent to the flat region, wherein:

relative to the flat region, the microstructure region comprises a plurality of convex portions and a plurality of concave portions;

the convex portions are in a shape of a cone; and any area of 0.1 mm*0.1 mm in the microstructure region has n convex portions, wherein n≤50;

wherein the convex portions each have a top portion, a distance D exists between every two adjacent top portions, wherein 14 µm≤D≤40 µm.

13. The lens module according to claim 12, wherein when the component for the lens module is the lens barrel, the microstructure region is located on at least one of an object-side surface, an image-side surface, and an inner annular surface of the component surface.

14. The lens module according to claim 12, wherein when the component for the lens module is the optical lens, the microstructure region is located on a non-optical region of the component surface and is not in contact with other components for the lens module.

15. The lens module according to claim 12, wherein when the component for the lens module is the pressure ring, the microstructure region is located on an inner ring surface of the component surface.

16. The lens module according to claim 12, wherein when the component for the lens module is the spacer ring, the microstructure region is located on an inner ring surface of the component surface.

17. The lens module according to claim 12, wherein the convex portions have a height H1 relative to the flat region, wherein H1≥4 µm.

18. The lens module according to claim 17, wherein 0.1≤H1/D≤3.5.

* * * * *